United States Patent
Myre et al.

(10) Patent No.: US 9,776,225 B2
(45) Date of Patent: Oct. 3, 2017

(54) SALT-IMPACTED SOIL TREATMENT PROCESS AND SYSTEM FOR REMEDIATING A SALT-IMPACTED SOIL

(71) Applicant: ENGLOBE CORP., Québec (CA)

(72) Inventors: Alexandre Myre, Québec (CA); Nicolas Moreau, Saint-Gilles (CA); François Lafrenière, Ste-Julie (CA); Donald Tremblay, Québec (CA); Christian Bélanger, L'Ancienne-Lorette (CA); Dany Landry, Québec (CA)

(73) Assignee: ENGLOBE CORP., Quebec, Quebec (CA)

( * ) Notice: Subject to any disclaimer, the term of this patent is extended or adjusted under 35 U.S.C. 154(b) by 0 days.

(21) Appl. No.: 14/435,288

(22) PCT Filed: Oct. 15, 2013

(86) PCT No.: PCT/CA2013/050777
§ 371 (c)(1),
(2) Date: Apr. 13, 2015

(87) PCT Pub. No.: WO2014/059540
PCT Pub. Date: Apr. 24, 2014

(65) Prior Publication Data
US 2015/0273545 A1 Oct. 1, 2015

Related U.S. Application Data (60) Provisional application No. 61/715,357, filed on Oct. 18, 2012, provisional application No. 61/787,016, filed on Mar. 15, 2013.

(51) Int. Cl.
*B09C 1/00* (2006.01)
*B09C 1/02* (2006.01)
(Continued)

(52) U.S. Cl.
CPC .............. *B09C 1/02* (2013.01); *B01D 61/025* (2013.01); *B09C 1/08* (2013.01); *C02F 1/441* (2013.01);
(Continued)

(58) Field of Classification Search
CPC ........................................................ B09C 1/02
See application file for complete search history.

(56) References Cited

U.S. PATENT DOCUMENTS

| 2,860,448 A | 11/1958 | Carasso |
| 3,660,068 A | 5/1972 | Wilson |

(Continued)

FOREIGN PATENT DOCUMENTS

WO 2012046098 A1 4/2012

OTHER PUBLICATIONS

E. Amezketa, et al., Efficiency of Sulfuric Acid, Mined Gypsum, and Two Gypsum By-Products in Soil Crusting Prevention and Sodic Soil Reclamation, Reproduced from Agronomy Journal, Published online by American Society of Agronomy, May 13, 2005, pp. 983-989.

(Continued)

*Primary Examiner* — John Kreck
(74) *Attorney, Agent, or Firm* — Merchant & Gould P.C.

(57) ABSTRACT

A process for remediating salt-impacted soils includes forming a heap of salt-impacted soil on an impermeable surface; irrigating the salt-impacted soil heap with at least one amendment solution; and collecting a leachate containing sodium ions at a base of the heap. A system remediates salt-impacted soil.

20 Claims, 3 Drawing Sheets

(51) Int. Cl.

| | |
|---|---|
| *B01D 61/02* | (2006.01) |
| *B09C 1/08* | (2006.01) |
| *C02F 1/44* | (2006.01) |
| *C02F 101/10* | (2006.01) |
| *C02F 103/06* | (2006.01) |

(52) U.S. Cl.
CPC ...... *C02F 2101/10* (2013.01); *C02F 2103/06* (2013.01)

(56) References Cited

U.S. PATENT DOCUMENTS

| | | | | |
|---|---|---|---|---|
| 4,012,219 | A | * | 3/1977 | Josephs ............... C05F 7/00 210/170.01 |
| 4,015,972 | A | | 4/1977 | Watkins et al. |
| 4,028,088 | A | | 6/1977 | Young et al. |
| 4,687,505 | A | | 8/1987 | Sylling et al. |
| 4,755,206 | A | | 7/1988 | Clark |
| 5,228,804 | A | | 7/1993 | Balch |
| 5,302,211 | A | * | 4/1994 | Bunger ............ B01D 11/0276 134/25.1 |
| 5,387,056 | A | * | 2/1995 | DeLuca ................ B09C 1/02 405/128.45 |
| 5,434,332 | A | * | 7/1995 | Cash .................... G21F 9/30 134/10 |
| 5,590,983 | A | | 1/1997 | Angell |
| 5,733,070 | A | | 3/1998 | Angell |
| 5,917,110 | A | | 6/1999 | Kust |
| 5,997,601 | A | | 12/1999 | Kust |
| 6,838,082 | B2 | | 1/2005 | Growcock et al. |
| 7,736,412 | B1 | | 6/2010 | Sanders |
| 2001/0029762 | A1 | | 10/2001 | Steele et al. |
| 2012/0177442 | A1 | * | 7/2012 | Kunz ................... B09C 1/062 405/128.85 |

OTHER PUBLICATIONS

Lyle D. Burns, Soil Amendment Product for Oil Field Brine Contaminated Soil—Field Testing Part II, Final report, Dec. 28, 2011, 35 pages, United States.

Mary Daily, Investigation and Remediation of Salt (Chloride)-Impacted Soil and Ground Water, Bureau of Environmental Remediation/Remedial Section Guidance, Mar. 2004 and revised on Nov. 18, 2005, 8 pages, BER Policy # BER-RS-13A.

Len J. Gawel, A Guide for Remediation of Salt/Hydrocarbon Impacted Soil, North Dakota Industrial Commission, , 2006, 56 pages, United States.

Ying Guo, Remediation Study for a Salt-affected Soil Impacted by the Oil and Gas Industry, University of Alberta, Department of Civil and Environment Engineering, 2009, 192 pages, Edmonton, Canada.

Jonathan Howe and Michael Wagner, The Effect of Papermill Wastewater and Organic Amendments on Sodium Accumulation by Potted Cottonwoods, Environmental Pollution, 1996, pp. 113-118, vol. 92, No. 2, Great Britain.

Mark Landress, Remediation of Sodium Contaminated Sites, Environmental Challenges and Innovations Conference, 2007, 20 pages, Gulf Coast.

Ion Ratiu, Remediation of Salt-Impacted Soils Using Automated Conductivity Monitoring, Leachate Collection, Irrigation, and Injection: Alternative Methods for In-Situ Remediation, Remediation Technologies Symposium, 2012, p. 93.

C. W. Robbins, Sodic Calcareous Soil Reclamation as Affected by Different Amendments and Crops, Agronomy Journal, Sep.-Oct. 1986, pp. 917 to 920, vol. 78.

Yuji Sakai et al., Alkali Soil Reclamation with Flue Gas Desulfurization Gypsum in China and Assessment of Metal Content in Corn Grains, Soil & Sediment Contamination, 2004, 13:65-80.

A.A. Siyal and Z.A. Abro, Salt Affected Soils Their Identification and Reclamation, Pakistan Journal of Applied Sciences, 2002, 2(5): 537-540.

\* cited by examiner

SALT-IMPACTED SOIL TREATMENT PROCESS AND SYSTEM FOR REMEDIATING A SALT-IMPACTED SOIL

CROSS-REFERENCE TO RELATED APPLICATIONS

This application is a National Stage Application of PCT/CA2013/050777, filed Oct. 15, 2013, which claims priority under 35USC§119(e) of US provisional patent applications 61/715,357 filed on Oct. 18, 2012 and 61/787,016 filed on Mar. 15, 2013, and which applications are incorporated herein by reference. To the extent appropriate, a claim of priority is made to each of the above disclosed applications.

TECHNICAL FIELD OF THE INVENTION

The technical field relates to remediation processes for salt-impacted soils and, more particularly, it relates to a process and a system for treating salt-impacted soils.

BACKGROUND

Oil exploration and production as well as road salt storage are among activities that have generated salt-impacted soil over the last decades. When present in high proportions, salts can have adverse effects on soil quality as they increase osmotic pressure, rendering land unsuitable for agricultural uses. Since salts are highly soluble, they generally accumulate quickly into the soil and can also have a negative impact on ground water.

There is thus a need for an economically viable and effective treatment process for remediation of salt-impacted soils.

BRIEF SUMMARY

It is therefore an aim of the present invention to address the above mentioned issues.

According to a general aspect, there is provided a process for remediating salt-impacted soils. The process comprises: excavating a salt-impacted soil; placing the excavated salt-impacted soil in a heap on an impermeable surface; irrigating the salt-impacted soil heap with an amendment solution; and collecting a leachate containing the leached salt at a base of the heap.

According to another general aspect, there is provided an apparatus for remediating salt-impacted soil. The apparatus comprises: an impermeable surface for receiving an excavated salt-impacted soil heap; an irrigation system configured to irrigate substantially uniformly the excavated salt-impacted soil heap; at least one amendment solution tank in fluid communication with the irrigation system; and a leachate recovery system collecting the leachate flowing on the impermeable surface.

According to another general aspect, there is provided a process for remediating salt-impacted soils, the process comprising: forming a heap of salt-impacted soil on an impermeable surface; irrigating the salt-impacted soil heap with at least one amendment solution; and collecting a leachate containing sodium ions at a base of the heap.

In an embodiment, the process further comprises excavating the salt-impacted soil and placing the excavated salt-impacted soil in heap.

In an embodiment, the process further comprises characterizing the salt-impacted soil to obtain a salt-impacted soil characterization and determining an amendment strategy based on the salt-impacted soil characterization. Characterizing the salt-impacted soil can comprise measuring at least one of an electrical conductivity of the salt-impacted soil, an adsorption ratio of the salt-impacted soil, a chloride content of the salt-impacted soil, a sulfate content of the salt-impacted soil, pH of the salt-impacted soil, texture of the salt-impacted soil, a cation exchange capacity of the salt-impacted soil, and an exchangeable sodium percentage of the salt-impacted soil. Determining the amendment strategy can comprise at least of: selecting the at least one amendment solution, selecting an injection sequence of the at least one amendment solution, selecting an injection flowrate for each of the at least one amendment solution, selecting an irrigation pattern, and selecting an amendment.

In an embodiment, the process further comprises adding at least one of an organic amendment and an inorganic amendment to the salt-impacted soil. The amendment can comprise an organic amendment selected from the group consisting of: sphagnum peat, wood chips, grass clippings, straw, compost, manure, biosolids, sawdust, and mixture thereof. The amendment can comprise an inorganic amendment selected from the group consisting of: sand, crushed stone, crushed concrete and mixture thereof. In an embodiment, the amendment is added to the salt-impacted soil in a concentration ranging between 0% (vol.) and 20% (vol.).

In an embodiment, irrigating the salt-impacted soil heap with at least one amendment solution comprises irrigating sequentially the salt-impacted soil heap with at least two amendment solutions.

In an embodiment, the process further comprises monitoring properties of the salt-impacted soil during irrigation thereof and modifying the at least one amendment solution based on the monitored properties.

In an embodiment, the process further comprises irrigating the salt-impacted soil heap with water following the irrigation with the least one amendment solution.

In an embodiment, the process further comprises monitoring properties of the salt-impacted soil during irrigation thereof and irrigating the salt-impacted soil heap with water when at least one predetermined soil property threshold has been reached based on the monitored properties.

In an embodiment, irrigating the salt-impacted soil heap with at least one amendment solution comprises irrigating at a flowrate ranging between about 0.1 to about 1.0 liter per hour for each irrigation point.

In an embodiment, the at least one amendment solution comprises a calcium-based aqueous amendment solution. The calcium-based aqueous amendment solution can comprise at least one calcium chloride, calcium nitrate, calcium acetate, and calcium sulfate.

In an embodiment, the at least one amendment solution comprises an acid solution.

In an embodiment, irrigating the salt-impacted soil heap with the at least one amendment solution comprises pulsed irrigating the salt-impacted soil heap.

In an embodiment, the process further comprises treating the leachate in a water treatment unit to produce at least two water-based products. The at least two water-based products can comprise a high salt content water and a low salt content water. In an embodiment, the process further comprises recycling the low salt content water in the at least one amendment solution for irrigation.

In an embodiment, the impermeable surface comprises an impermeable treatment membrane. In an embodiment, the impermeable treatment membrane is a polymeric membrane.

In an embodiment, the process further comprises characterizing the salt-impacted soil heap following irrigation thereof and returning the salt-impacted soil in an excavation if the characterization of the salt-impacted soil meets at least one predetermined threshold.

In an embodiment, the process further comprises covering the salt-impacted soil heap with an impermeable tarpaulin.

In an embodiment, the impermeable surface comprises one of a concrete covered surface and an asphalt covered surface.

In an embodiment, the salt-impacted soil is characterized by a measured soil electrical conductivity above 2 and a measured soil sodium adsorption ratio above 4.

In an embodiment, the irrigating is carried out during about 20 to 90 days.

According to still another general aspect, there is provided a system for remediating salt-impacted soil. The system comprises: an impermeable surface for receiving a salt-impacted soil heap; an irrigation system configured to irrigate the salt-impacted soil heap; at least one amendment solution tank in fluid communication with the irrigation system; and a leachate recovery system collecting the leachate flowing on the impermeable surface.

In an embodiment, the salt-impacted soil is an excavated salt-impacted soil.

In an embodiment, the impermeable surface is raised peripherally.

In an embodiment, the irrigation system is configured to irrigate the salt-impacted soil heap substantially uniformly.

In an embodiment, the leachate recovery system comprises a drainage channel in proximity of the impermeable surface to recover the leachate.

In an embodiment, the leachate recovery system comprises a process water collection piping network.

In an embodiment, the at least one amendment solution tank comprises at least one calcium-based aqueous amendment solution tank.

In an embodiment, the irrigation system includes one main pipe connected to the at least one amendment solution tank and in fluid communication with a plurality of secondary pipes distributed over the salt-impacted soil heap. In an embodiment, at least one of the secondary pipes is a dripline. In an embodiment, at least one of the secondary pipes ends with a dripper. In an embodiment, at least one of the secondary pipes is a soaker hose.

In an embodiment, the secondary pipes are provided at about each 30 centimeters to about each one meter above the salt-impacted soil heap.

In an embodiment, the system further comprises a water treatment unit in fluid communication with the leachate recovery system. In an embodiment, the water treatment unit comprises a reverse osmosis unit. In an embodiment, the water treatment unit produces at least two water-based products. The at least two water-based products can comprise a high salt content water and a low salt content water. In an embodiment, the system comprises a low salt content water tank for storing the low salt content water produced by the water treatment unit, the low salt content water tank being in liquid communication with at least one of the amendment solution tank.

In an embodiment, the system further comprises an impermeable tarpaulin covering the salt-impacted soil heap and at least part of the irrigation system extending between a top of salt-impacted soil heap and the impermeable tarpaulin.

In an embodiment, the at least one amendment solution tank comprises at least two amendment solution tanks, each one of the at least two amendment solution tanks containing a different calcium-based aqueous amendment solution, and being selectively in fluid communication with the irrigation system.

In an embodiment, the system further comprises at least one water tank in fluid communication with the irrigation system.

In an embodiment, the irrigation system is a pulsed irrigation system.

In an embodiment, the impermeable surface comprises an impermeable treatment membrane. The impermeable treatment membrane can be a polymeric membrane. The impermeable surface can comprise one of a concrete covered surface and an asphalt covered surface.

BRIEF DESCRIPTION OF THE DRAWINGS

It will be noted that throughout the appended drawings, like features are identified by like reference numerals.

DETAILED DESCRIPTION

Figure 1:
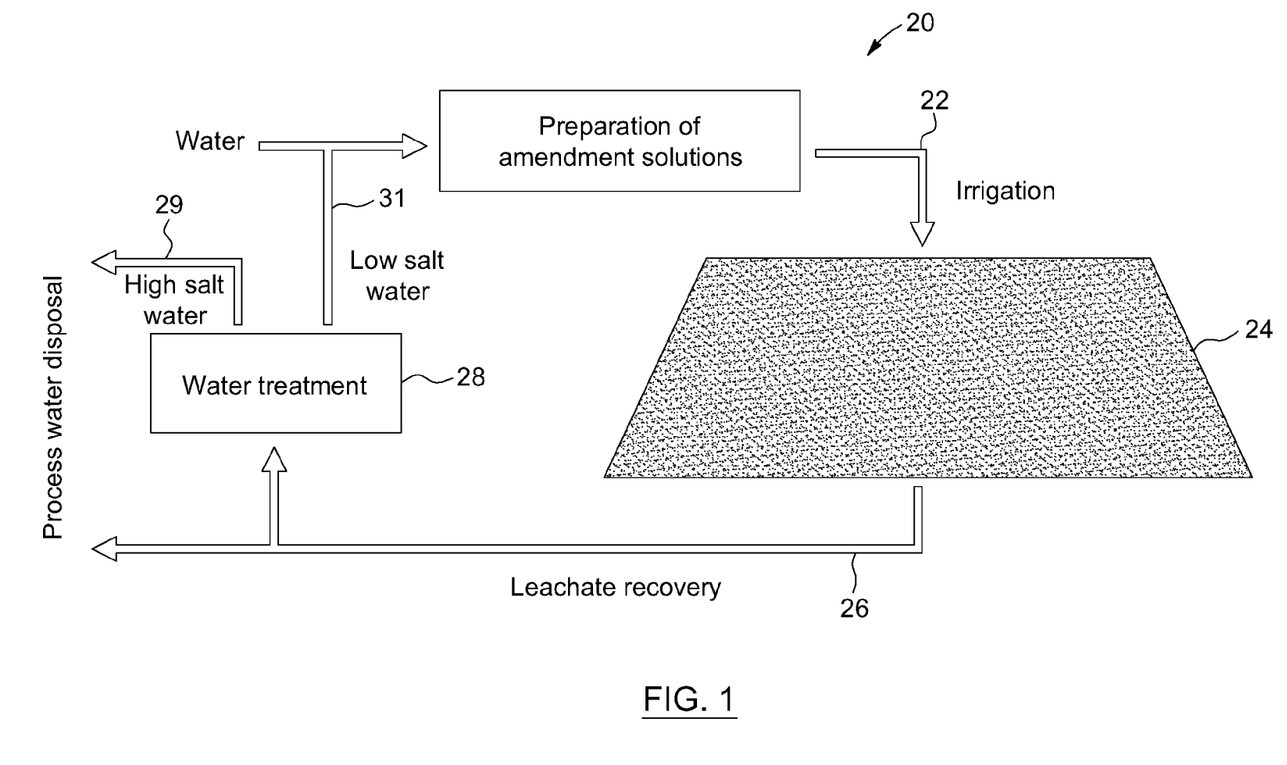
FIG. 1 is a schematical representation of a salt-impacted soil treatment process in accordance with an embodiment.

Referring now to the drawings and, more particularly, to FIG. 1, there is shown an embodiment of a salt-impacted soil remediation process 20. The salt-impacted soil treatment process 20 relies on cation exchange to remove excess sodium from the soil.

In summary, soluble salts are extracted from the soil by an amendment solution 22 (or leaching solution) which is irrigated on an excavated soil heap (or heap) 24. In an embodiment, the amendment solution is a calcium-based amendment solution suitable to extract sodium ions. The soil heap 24 is disposed on an impermeable treatment surface, such as an impermeable treatment membrane. The soil heap 24 is irrigated with the amendment solution 22 including water. In other words, the amendment solution 22 is a water-based amendment solution. In an embodiment, the amendment solution is a calcium-based amendment solution and, in a particular embodiment, the amendment solution is a calcium-based aqueous amendment solution. The leachate 26, or process water, generated during treatment, from the amendment solution flowing through the soil heap 24, is recovered and pumped to a water treatment unit 28 which produces two water-based products: (a) a high salt content water (or brine) 29 and (b) a low salt content water 31. The low salt content water 31 can be recycled in the treatment process and, more particularly, it can be used in the amendment solution 22. In an alternative embodiment, the process and the associated system can be free of water treatment unit 28. In another alternative embodiment, the low salt water 31 can be used for other applications rather than being recycled in the amendment solution 22.

Figure 2:
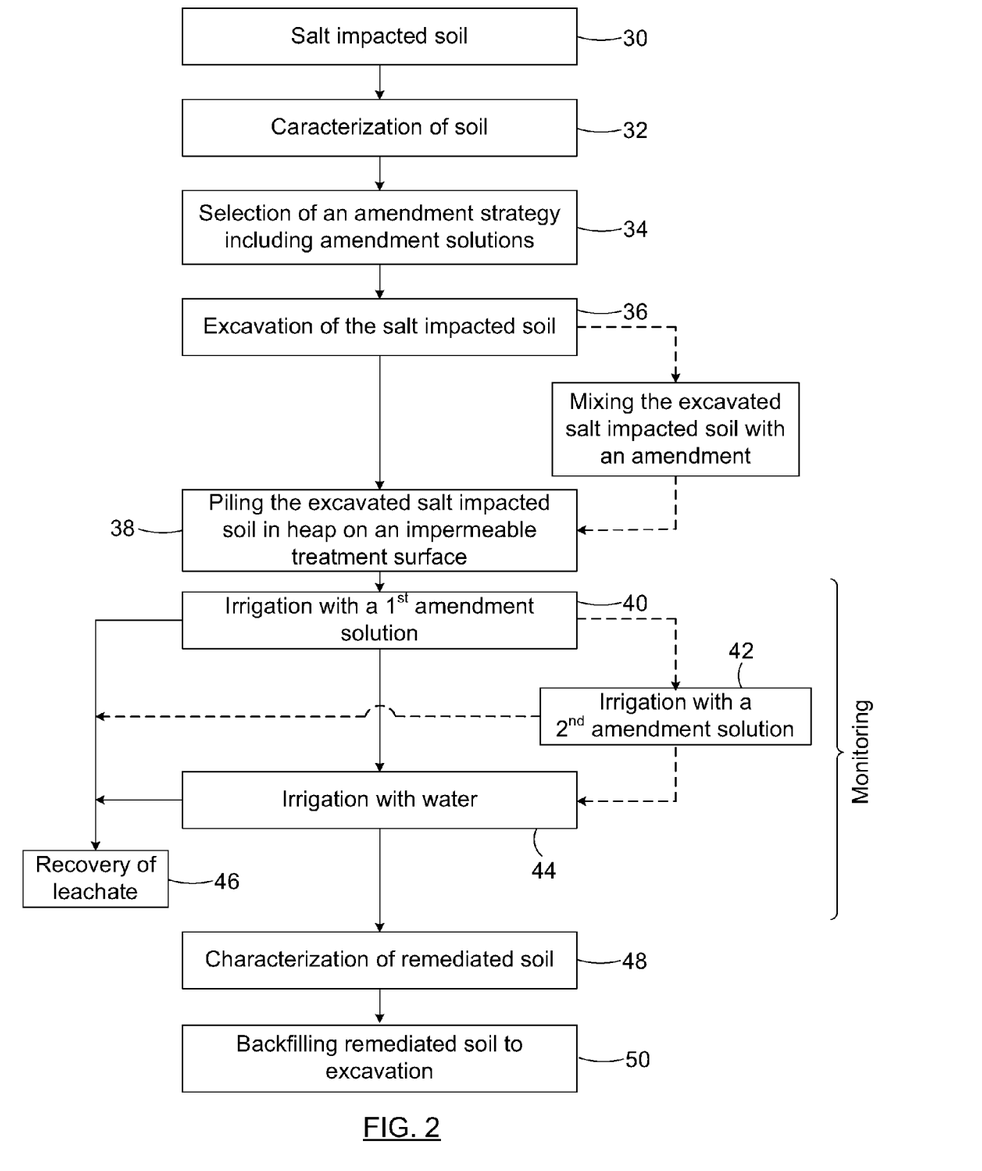
FIG. 2 is a flowchart representing process steps carried out for remediating a salt-impacted soil in accordance with an embodiment.

Turning now to FIG. 2, there is shown, in more details, an implementation of the process for remediating salt-impacted soils 30.

The salt-impacted soil 30 is first characterized 32. Soil characterization includes determination of soil properties. Amongst others, the following properties of the soil are measured: the electrical conductivity (EC), the sodium adsorption ratio (SAR), the chloride content, the sulfate content, the sodium content (soluble or total), the pH, soil texture, the clay content, the cation exchange capacity (CEC) (total CEC-sodium, total CEC-calcium, fraction of CEC-sodium as adsorbed form, fraction of CEC-sodium as free form, fraction of CEC-calcium as adsorbed form, fraction of CEC-calcium as free form), the exchangeable calcium percentage, and the exchangeable sodium percentage (ESP). In some embodiments, only some of the above mentioned soil properties are measured. In alternative embodiments, other soil properties can be measured. For instance and without being limitative, a soil can be characterized as having an excess salt content when its electrical conductivity is above about 2 and its sodium adsorption ratio is above about 4.

Based on the soil characterization, an amendment strategy is selected 34. The choice of the amendment strategy includes the selection of an irrigation strategy, including one or several amendment solution(s), and determining if an organic and/or inorganic amendment will be added to the excavated soil, amongst others.

More particularly, based on the properties of the salt-impacted soil, the irrigation strategy is determined. The selection of the irrigation strategy includes the selection of the amendment solution(s), their injection sequence, if any, their flowrate and the irrigation pattern. As mentioned above, in an embodiment, at least some of the amendment solution(s) are calcium-based aqueous solution(s). The selection of the amendment solution(s) include the selection of their composition and the concentration of the constituent (s). The calcium-based amendment solution can include either calcium chloride, calcium nitrate, calcium acetate or calcium sulfate in different concentrations. In the amendment solution, the calcium ions are soluble. The amendment solution also includes water and, optionally, an acid solution. The acid solution substantially prevents clogging of the irrigation network from calcium carbonate scaling (incrustation). In an implementation, the amendment solution should be free of solid particles. During the treatment process, the calcium ions, in aqueous solution, displace the sodium ions from the cation exchange complex of the finer soil particles by ion exchange as the calcium-enriched water percolates through the excavated soil heap. Furthermore, in addition to the calcium ion constituent(s), the amendment solution(s) can include other chemical products such as and without being limitative inorganic acids such as, but not limited to, sulfuric acid, citric acid and/or hydrochloric acid.

Based on the characterization results including the soil properties, for some salt-impacted soils, an organic and/or inorganic amendment can be added to the excavated salt-impacted soil while it is piled-up on the impermeable treatment surface. Organic amendments can include, for instance and without being limitative, lignocellulosic and/or ligneous, and/or fibrous amendments. For instance, organic amendments can include sphagnum peat, wood chips, grass clippings, straw, compost, manure, biosolids, sawdust, and mixture thereof. Inorganic amendments can include, for instance and without being limitative, mineral and/or limestone amendment. Inorganic amendments can include sand, crushed stone, crushed concrete and mixture thereof. The soil organic and/or inorganic amendment is mixed with the excavated soil. The organic and/or inorganic amendment modifies the physical properties of the soil to promote removal of excess salt therefrom. For instance, heavy soils, i.e. soil with high clay content, require organic and/or inorganic amendments to dry the soil and increase its permeability. Soils characterized by a high permeability will drain quicker, have higher water infiltration rate, and increased uniformity of water infiltration and, therefore, uniform distribution of the amendment solution. Depending on the soil's physical properties determined during the soil characterization step and the nature of the amendments added, organic and/or inorganic amendments can be added in a concentration ranging between 0 and 20% (vol.).

The salt-impacted soil is excavated 36 and placed in a heap on an impermeable treatment surface 38 intended to collect substantially all the process water (or leachate) generated during treatment. The heap is relatively large. For instance, in a non-limitative embodiment, the heap can be 1 to 3 meters high, between 7 to 70 meters wide, and between 17 and 300 meters long. In an alternative non-limitative embodiment, the heap can be about 2 meters high, between 15 to 35 meters wide, and between 35 and 150 meters long.

The impermeable treatment surface can include an impermeable membrane (or pad), such as and without being limitative, a polyethylene membrane that can be disposed under the excavated soil heap, or a hard waterproof surface such as concrete or an asphalt covered surface.

The peripheral section of the impermeable treatment membrane can be raised, either partially or entirely, to ensure that process water does not flow outside the treatment area and that process water can be substantially entirely recovered. A drainage channel can be provided in proximity of the impermeable treatment membrane to recover and carry away process water to one or several pumping station (s). The drainage channel can be a network of drainage channels in liquid communication with a process water collection piping network.

Working on an impermeable treatment surface offers numerous advantages over the in-situ traditional remediation techniques. The in-situ approach is always subject to re-salinization of the soil by leached salts. When working on the impermeable treatment surface, the salts are definitively removed from the soil via a process water collection piping network, thereby ensuring the long-term effectiveness of the remediation. Once backfilled, the risk of re-contamination is therefore eliminated.

An impermeable tarpaulin can be disposed over the excavated soil heap and the irrigation system to prevent rain from irrigating the soil heap and improve process control.

It is appreciated that the salt-impacted soil can be excavated 36 and, optionally, placed in heap 38 prior to carrying out the soil characterization step 32 and/or the selection of the amendment strategy including the choice of the irrigation strategy. Depending on the soil properties, an amendment strategy including two or more amendment solutions may be necessary in order to ensure that the remediated soil meets selected criteria at the end of the remediation process. For instance and without being limitative, the amendment strategy can include a first amendment solution including calcium chloride and as second amendment solution including calcium nitrate. The two amendment solutions can be injected sequentially. Moreover, the injection time of both amendment solutions can be similar or different. In an alternative embodiment, the amendment strategy can include a single amendment solution including a mixture of calcium chloride and calcium nitrate.

The excavated soil placed in heap is then irrigated with at least a first calcium-based aqueous amendment solution 40. The calcium-based amendment solution is required to promote sodium displacement in the soil exchange complex. The amendment solution is added to the surface of the excavated soil heap through an irrigation system designed to distribute substantially uniformly and at a predetermined flow rate the amendment solution(s). The irrigation process can be a pulsed superficial irrigation or a continuous superficial irrigation, and combinations thereof. For instance, the excavated soil heap can be irrigated during a percentage of the time. For instance and without being limitative, the excavated soil heap can be irrigated during between 10% to 100% of the time, the remaining time, the irrigation system is turned off. The irrigation strategy aims at optimizing water distribution to maximize salt leaching while reducing treatment time and the total volume of amendment solution(s) including water added.

The irrigation system is designed to distribute substantially uniformly and at a specific flow rate, the calcium-based amendment(s) and water at the surface of the heap. In a non-limitative embodiment, the irrigation system includes one main pipe which is operatively connected to a plurality of secondary pipes to divide the amendment solution flow into a plurality of secondary flows. In a non-limitative embodiment, each one of the secondary pipes ends with a dripper. The dripper can be selected and adjusted to control the speed at which the amendment solution is distributed. In another non-limitative embodiment, the secondary pipes can be driplines, i.e. hoses with built-in drippers. In still another non-limitative embodiment, the secondary pipes can be soaker hoses, i.e. hoses with perforations to let the amendment solution seep into the excavated soil heap. The irrigation system can include a combination of the above described irrigation pipes.

It is appreciated that the number of secondary pipes, the density of the drippers, and the spacing between adjacent drippers can be varied to modify the irrigation strategy. For instance and without being limitative, drippers, provided either at the end of the secondary pipes or in driplines, can be provided at about each 30 centimeters to about each one meter. The secondary pipes are spread about evenly on the top of the excavated soil heap to substantially uniformly distribute the amendment solution.

At each of the amendment solution injection points, the injection flowrate for each irrigation point can vary between about 0.1 to about 1.0 liter per hour depending on the soil properties.

The irrigation system is an important feature of the process influencing water distribution homogeneity through the soil. Leaching of a soil heap represents a challenge as the contact probability between the amendment solution and the exchange complex is significantly reduced. The calcium-based aqueous amendment solution must be brought in contact with a maximum of cation exchange sites. In order to do this, irrigation solution must be substantially homogeneously distributed through the excavated soil heap and this is particularly challenging since the process does not involve saturated conditions.

Properties of the soil, such as and without being limitative, the electrical conductivity and the sodium content, can be monitored during the irrigation process. Based on the measured properties, the amendment solution and its injection parameters can be modified along the process. For instance and without being limitative, the excavated soil heap can be irrigated with two or more amendment solutions during the treatment process 42. In some implementations, the treatment process can end with the irrigation of the heap with water, free of acid solution. For instance, the treatment process can be carried out during about 20 to 90 days and, in an embodiment, above 40 days.

Continuously during the irrigation process, the leachate (or process water) is collected at the base 46 of the heap and, optionally, sent to a water treatment unit, such as a reverse osmosis unit, allowing a portion to be re-injected as amended-irrigation water. More particularly, the water treatment process can produce two products: brine characterized by high salt content and low salt content water. The concentrated brine resulting from the water treatment can be disposed of in a deep injection well or re-used to other ends as salt brine, deicing or dust control fluids, for instance. The low salt content water can be re-injected as amended-irrigation water.

The apparatus can further include an equipment module including pumps, valves, measurement instruments and control panels, operatively connected together, that serve to feed and control the irrigation system with the amendment solution(s).

The properties of the soil, following the leaching process, are measured 48 to determine whether predetermined targets, such as and without being limitative, the electrical conductivity, the sodium adsorption ratio, the chloride content, are met. The soil is returned in the excavation 50.

The salt-impacted soil treatment process described above allows for the remediation of large volume of salt impacted soils that otherwise, would be disposed of in landfills. Once treated, these soils present appropriate characteristics for agricultural uses, and groundwater quality significantly improves following the remediation of these impacted sites. Finally, treatment of these salt-impacted soils reduces transport associated to disposal activities and to the need of backfilling excavation holes with clean material and consequently, reduction in greenhouse gas (GHG) emissions.

Figure 3:
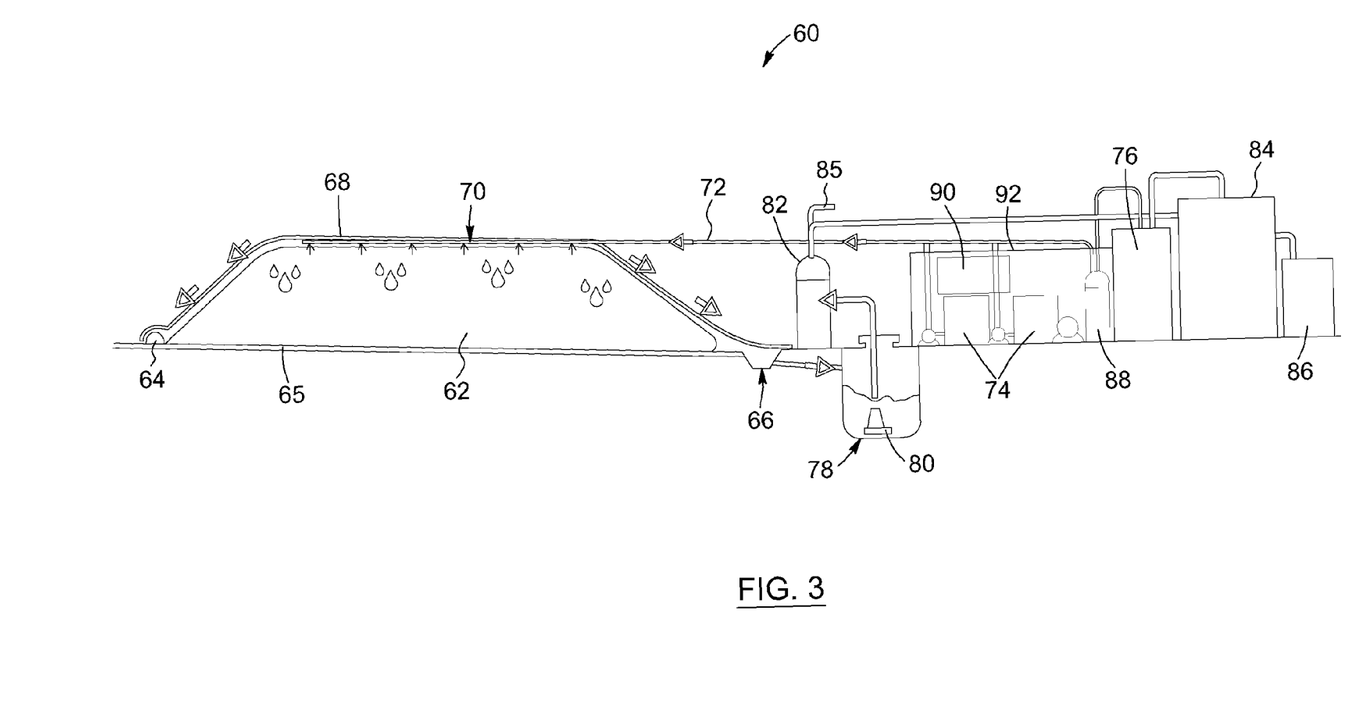
FIG. 3 is a schematical representation of a system for carrying out the salt-impacted soil treatment process in accordance with an embodiment.

Referring now to FIG. 3, there is shown a schematic system 60 for carrying out the above-described salt-impacted soil treatment process 20. The excavated salt-impacted soil 62, including or not an organic and/or an inorganic amendment, is placed on an impermeable treatment surface 65 and, in the embodiment shown, an impermeable membrane. The heap 62 is partially surrounded by a ridge 64 which ensures that process water does not flow outwardly of the impermeable treatment surface 65. A drainage channel 66 surrounds the remaining section of the periphery of the heap 62 and is designed to recover and carry away process water, as will be described in more details below.

The excavated soil heap 62 can be covered by an impermeable tarpaulin 68 to prevent rain from irrigating the soil heap 62 and improve process control. The irrigation system 70 is placed over the heap 62, between the top of heap 62 and the impermeable tarpaulin 68, if any. Amendment solution(s) and irrigation water selectively flow in a main pipe 72 from amendment solution tank(s) 74 and a feed water tank 76, and are distributed over the heap 62 through a network of secondary pipes (not shown) connected to, or in liquid communication with, the main pipe 72. It is appreciated that the irrigation system 70 can include one or more main pipes 72. The irrigation system further includes pumps (not shown) to ensure a flow of the amendment solution(s) and the irrigation water in the pipes 72 and valves to control the flowrate and the liquid, either the amendment solution(s) or water, flowing in the irrigation system 70. In an alternative embodiment, the pumps can be variable speed pumps and the flowrate can be controlled directly through the pumps.

The process water flows into the drainage channel 66 and into the pumping station 78 before being pumped by a pump 80 in a process water tank 82 and being then transferred to the water treatment unit 84. Process water contained in the process water tank 82, entirely or only a percentage thereof, can also be directed toward sewers through suitable pipe(s) 85. As mentioned above, the water treatment unit 84 produces two water-based outputs: a concentrated brine which is sent to a tank 86 for disposal or being re-used and water having a low salt content which can be sent to the feed water tank 76. As mentioned above, in an embodiment, the low salt content can be re-injected in the treatment process as amended-irrigation water.

In alternative embodiments, the system 60 can include additional equipment or equipment can be removed from the embodiment shown.

All the units, including the pumps, valves, and the like, can be operatively connected to a controller 90 which controls the flowrate and the configuration (open configuration or closed configuration) of the units. Furthermore, part of the units, including the pumps and some tanks, can be housed in a housing 92. The system 60 can further include a pressurized water tank 88 that is used to obtain a substantially uniform injection rate throughout the piled-up soil.

EXAMPLE

An example of a process carried out for remediating a salt-impacted soil will be described below. The characterization of the salt-impacted soil was carried out and Table 1 shows the measured properties of the salt-impacted soil prior the remediation process (column 3) and following the remediation process (column 4).

TABLE 1

Characterization of the salt-impacted soil.

| Sample | Units | Untreated soil | Treated soil |
|---|---|---|---|
| EC (mS/cm) | mS/cm | 16 | 0.7 |
| SAR | unitless | 39 | 2.0 |
| pH | unitless | 7.2 | 7.6 |
| $Cl_{soluble}$** (mg/kg) | mg/kg d.b. | 3 000 | 29 |
| $Na_{soluble}$** | mg/kg d.b. | 2 140 | 30 |
| $SO4_{soluble}$** (mg/kg) | mg/kg d.b. | 28 | 68 |
| $Na_{total}$* | mg/kg d.b. | 3295 | n.a. |
| Clay*** | % | 26 | n.a. |
| Cation exchange capacity | cmol$^+$/kg | 17.4 | 16.8 |
| Exchangeable sodium percentage | % | 33 | 4 |
| Exchangeable calcium percentage | % | 51 | 91 |
| Total CEC-sodium | mg/kg d.b. | 2959 | 91 |
| Fraction of CEC-sodium as adsorbed form | mg/kg d.b. | 1332 | 58 |
| Fraction of CEC-sodium as free form | mg/kg d.b. | 1628 | 33 |
| Total CEC-calcium | mg/kg d.b. | 1870 | 3066 |
| Fraction of CEC-calcium as adsorbed form | mg/kg d.b. | 1772 | 3066 |
| Fraction of CEC-calcium as free form | mg/kg d.b. | 99 | 0 |

\* total metal soil extraction
\*\*soluble as defined by satpaste method
\*\*\*clay particle defined as being <5 um
n.a: not analyzed The amendment strategy that was determined and carried out is as follows. The salt-impacted soil heap was irrigated during 90 days. During the first thirty days, the salt-impacted soil heap was irrigated with an aqueous-based calcium chloride solution including sulfuric acid and, during the following sixty days, the salt-impacted soil heap was irrigated with water. In an embodiment, the sulfuric acid content is adjusted to obtain a pH between 4 and 7. The irrigation sequence was a pulsed irrigation. More particularly, the soil heap was irrigated continuously during thirteen minutes at a flowrate of 0.3 liters per hour for each dripper, followed by forty seven minutes without irrigation. The irrigation system included drippers, provided at the end of secondary pipes. The drippers were provided at about six to twelve inches from one another on the top of the soil heap.

It will be appreciated that the processes described herein may be performed in the described order, or in any other suitable order.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention. The scope of the invention is therefore intended to be limited solely by the scope of the appended claims.

The invention claimed is:

1. A process for remediating salt-impacted soils, the process comprising:
   Adding at least one of an organic amendment and an inorganic amendment in solid state to the salt-impacted soil in a concentration of up to 20% by volume;
   Forming a heap of salt-impacted soil on an impermeable surface;
   Irrigating the salt-impacted soil heap through a plurality of irrigation points with at least one amendment solution at a flowrate ranging between about 0.1 liters per hour to about 1.0 liter per hour for each irrigation point of the plurality of irrigation points; and
   Collecting aleachate containing sodium ions at a base of the heap.

2. The process as claimed in claim 1, further comprising excavating the salt-impacted soil and wherein said forming comprises placing the excavated salt-impacted soil in heap.

3. The process as claimed in claim 1, further comprising characterizing the salt-impacted soil to obtain a salt-impacted soil characterization and determining an amendment strategy based on the salt-impacted soil characterization.

4. The process as claimed in claim 3, wherein the salt-impacted soil comprises measuring at least one of an electrical conductivity of the salt-impacted soil, an adsorption ratio of the salt-impacted soil, a chloride content of the salt-impacted soil, a sulfate content of the salt-impacted soil, pH of the salt-impacted soil, texture of the salt-impacted soil, a cation exchange capacity of the salt-impacted soil, and an exchangeable sodium percentage of the salt-impacted soil and determining the amendment strategy comprises at least one of: selecting the at least one amendment solution, selecting an injection sequence of the at least one amendment solution, selecting an injection flowrate for each of the at least one amendment solution, selecting an irrigation pattern, and selecting an amendment.

5. The process as claimed claim 1, further comprising monitoring properties of the salt-impacted soil during irrigation thereof and modifying the at least one amendment solution based on the monitored properties.

6. The process as claimed in claim 1, further comprising monitoring properties of the salt-impacted soil during irrigation thereof and irrigating the salt-impacted soil heap with water when at least one predetermined soil property threshold has been reached based on the monitored properties.

7. The process as claimed in claim 1, wherein irrigating the salt-impacted soil heap with the at least one amendment solution comprises pulsed irrigating the salt-impacted soil heap and the at least one amendment solution comprises at least one of a calcium-based aqueous amendment solution and an acid solution.

8. The process as claimed in claim 1, further comprising treating the leachate in a water treatment unit to produce at least two water-based products including a high salt content water and a low salt content water, the process further comprising recycling the low salt content water in the at least one amendment solution for irrigation.

9. The process as claimed in claim 1, wherein the impermeable surface comprises at least one of an impermeable treatment membrane, a concrete covered surface and an asphalt covered surface.

10. The process as claimed claim 1, further comprising characterizing the salt-impacted soil heap following irrigation thereof and returning the salt-impacted soil in an excavation if the characterization of the salt-impacted soil meets at least one predetermined threshold.

11. The process as claimed in claim 1, further comprising covering the salt-impacted soil heap with an impermeable tarpaulin.

12. The process as claimed in claim 1, wherein the salt-impacted soil is a measured soil electrical conductivity above 2 mS/cm and a measured soil sodium adsorption ratio above 4.

13. A process for remediating salt-impacted soils, the process comprising:
    forming a heap of salt-impacted soil on an impermeable surface;
    irrigating the salt-impacted soil heap through a plurality of irrigation points with at least one amendment solution, comprising irrigating at a flowrate ranging between about 0.1 to about 1.0 liter per hour for each irrigation point of the plurality of irrigation points; and
    collecting a leachate containing sodium ions at a base of the heap.

14. The process as claimed in claim 13, further comprising excavating the salt-impacted soil and wherein said forming comprises placing the excavated salt-impacted soil in heap, the process further comprises characterizing the salt-impacted soil to obtain a salt-impacted soil characterization by measuring at least one of an electrical conductivity of the salt-impacted soil, an adsorption ratio of the salt-impacted soil, a chloride content of the salt-impacted soil, a sulfate content of the salt-impacted soil, pH of the salt-impacted soil, texture of the salt-impacted soil, a cation exchange capacity of the salt-impacted soil, and an exchangeable sodium percentage of the salt-impacted soil; and determining an amendment strategy based on the salt-impacted soil characterization by at least of: selecting the at least one amendment solution, selecting an injection sequence of the at least one amendment solution, selecting an injection flowrate for each of the at least one amendment solution, selecting an irrigation pattern, and selecting an amendment.

15. The process as claimed in claim 13, wherein irrigating the salt-impacted soil heap with the at least one amendment solution comprises pulsed irrigating the salt-impacted soil heap and the at least one amendment solution comprises at least one of a calcium-based aqueous amendment solution and an acid solution.

16. The process as claimed in claim 13, wherein the impermeable surface comprises at least one of an impermeable treatment membrane, a concrete covered surface and an asphalt covered surface and the process further comprises covering the salt-impacted soil heap with an impermeable tarpaulin.

17. A process for remediating salt-impacted soils, the process comprising:
    forming a heap of salt-impacted soil on an impermeable surface;
    irrigating the salt-impacted soil heap through a plurality of irrigation points with at least one amendment solution at a flowrate ranging between about 0.1 liters per hour to about 1.0 liter per hour for each irrigation point of the plurality of irrigation points, wherein the at least one amendment solution comprises an acid solution; and
    collecting aleachate containing sodium ions at a base of the heap.

18. The process as claimed in claim 17, further comprising excavating the salt-impacted soil and wherein said forming comprises placing the excavated salt-impacted soil in heap, the process further comprises characterizing the salt-impacted soil to obtain a salt-impacted soil characterization by measuring at least one of an electrical conductivity of the salt-impacted soil, an adsorption ratio of the salt-impacted soil, a chloride content of the salt-impacted soil, a sulfate content of the salt-impacted soil, pH of the salt-impacted soil, texture of the salt-impacted soil, a cation exchange capacity of the salt-impacted soil, and an exchangeable sodium percentage of the salt-impacted soil; and determining an amendment strategy based on the salt-impacted soil characterization by at least of: selecting the at least one amendment solution, selecting an injection sequence of the at least one amendment solution, selecting an injection flowrate for each of the at least one amendment solution, selecting an irrigation pattern, and selecting an amendment.

19. The process as claimed in claim 18, wherein irrigating the salt-impacted soil heap with the at least one amendment solution comprises pulsed irrigating the salt-impacted soil heap and the at least one amendment solution further comprises a calcium-based aqueous amendment solution.

20. The process as claimed in claim 18, wherein the impermeable surface comprises at least one of an impermeable treatment membrane, a concrete covered surface and an asphalt covered surface and the process further comprises covering the salt-impacted soil heap with an impermeable tarpaulin.

* * * * *